July 7, 1964

L. M. GERMAIN 3,140,442

TIME OF OCCURRENCE TELEMETERING APPARATUS RELYING UPON
EXTRAPOLATION OF A CHARGING CURVE
FROM SAMPLED VOLTAGES

Filed Oct. 1, 1958

INVENTOR
LLOYD M. GERMAIN
BY Hurwitz & Rose
ATTORNEYS

United States Patent Office 3,140,442
Patented July 7, 1964

3,140,442
TIME OF OCCURRENCE TELEMETERING APPARATUS RELYING UPON EXTRAPOLATION OF A CHARGING CURVE FROM SAMPLED VOLTAGES
Lloyd M. Germain, New York, N.Y., assignor, by mesne assignments, to Electro-Mechanical Research, Inc., Sarasota, Fla., a corporation of Connecticut
Filed Oct. 1, 1958, Ser. No. 764,607
11 Claims. (Cl. 324—68)

The present invention relates generally to time of occurrence markers and more particularly to systems for assisting in determining when an event occurs with accuracy and transmitting an accurate indication of the time at which the event occurred over a low frequency or narrow band channel, the response time of which is inadequate, per se, to provide the required accuracy.

In the course of a missile test flight, for example, it is often necessary to know very accurately the time that a certain event takes place in respect to a reference event. This normally requires a high-frequency channel to be assigned to transmit a signal indicating the occurrence of such an event. The bandwidth required would depend upon the accuracy with which the time of occurrence must be known: bandwidth requirement increasing with increase in accuracy. Time-of-occurrence is usually related to some other event, for example the start of the test.

The present system makes it possible to indicate the time of occurrence of an event to a high degree of accuracy. This is accomplished by transmitting markers whose amplitudes correspond to some time unit which is determined by a timing reference, such as a telemeter commutator. The full scale of the marker pulses defines a unit of time. When the event occurs, in terms of a timing signal, the signal causes the discharge of a condenser substantially instantaneously, and thereafter permits same to re-charge linearly, preferably in a time equal to some predetermined number of sampling pulses generated, as by the commutator of a telemetering system which samples the condenser voltage. The time of occurrence, which is the time of discharge of the condenser, may be readily determined in terms of the intercept between the time axis and a straight line joining the peaks of the sampled pulses during the condenser's run-up.

Generally describing a preferred embodiment of the present invention, a condenser is maintained charged at some predetermined value V. Its voltage is sampled repetitively as by a telemeter's commutator.

The occurrence of an event to be timed causes the actuation of a one shot multivibrator or blocking oscillator. The latter momentarily closes a normally open switch thereby discharging the condenser of a triggered sawtooth generator, which includes the sampled condenser. The run-up of the condenser is arranged to last at least one but preferably several sampling time intervals, and following such run-up the condenser retains its charge or voltage at the value which obtained before discharge.

The time of discharge of the condenser may be readily established in terms of its known rate of rise of voltage, and the amplitude or amplitudes of the one or more pulses sampled during the run-up.

The time of occurrence of the event being monitored at a transmitter may be thus obtained with great accuracy at the receiver, although the channel's width required for the transmission of the sampled pulses can now be relatively narrow.

It is, accordingly, a broad object of the present invention to provide a system for measuring the time of occurrence of a randomly occurring event.

It is a further object of the present invention to provide a system for deriving low frequency information indicative of the occurrence time of a randomly occurring event and transmitting the information over a relatively narrow band channel, wherein the width of the channel is disproportionate with the required accuracy of the information transmitted.

The above and still further objects, features and advantages of the present invention will become apparent upon consideration of the following detailed description of one specific embodiment thereof, especially when taken in conjunction with the accompanying drawings, wherein.

Figure 1:
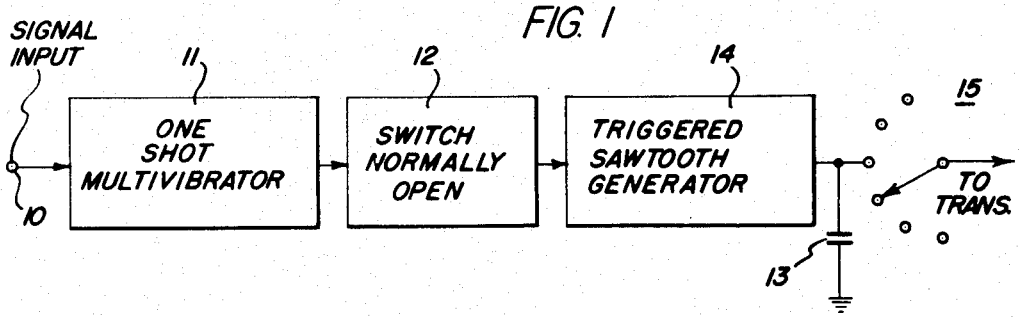
FIGURE 1 is a block diagram of a system according to the present invention.

Referring now more particularly to the accompanying drawings, the reference numeral 10 denotes a signal input terminal, wherein the signal is electrical and derives from or is in response to the occurrence of an event. Typical such events are switch closures or openings, or the attainment by a monitoring transducer of an output having some preselected character or amplitude.

In response to the input signal at terminal 10, a one shot multivibrator 11, or a blocking oscillator, is triggered and produces a short pulse. The latter serves momentarily to close a normally open electronic switch 12, such as a transistor switch. The closure of switch 12 discharges the condenser 13 of a triggered sawtooth generator 14. On cessation of the pulse the condenser monotonically runs up to its normal value. The time of run-up is preferably set to last at least twice the time between samplings of condenser voltage taken by a telemetering commutator 15, so that at least two sampled pulses will be of less than full amplitude. The latter two pulses establish a linear slope from which may be readily deduced, at a ground monitoring station, the actual time of occurrence of the monitored event, in terms of the intercept between the linear slope and the time axis.

Figure 2:
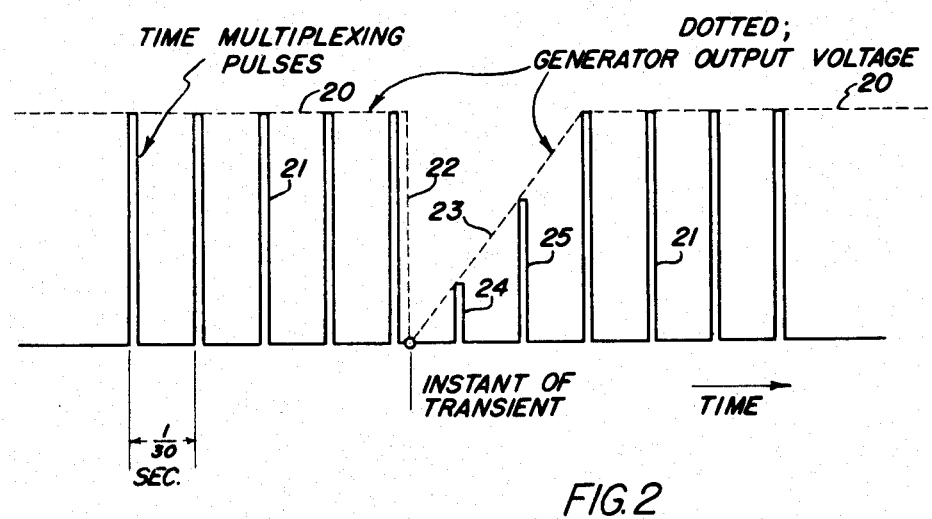
FIGURE 2 is a wave form diagram, useful in explaining the system of FIGURE 1.

Reference is made to FIGURE 2, wherein is shown a horizontal line 20, representing the normal voltage of condenser 13. The pulses 21 represent samples of condenser voltage as sensed by commutator 15. On occurrence of an event as, at 22, the voltage of condenser 13 is momentarily reduced to zero, but immediately proceeds to increase linearly, as at 23, until it again attains its normal value 20.

During the monotonic run-up 23, the samples are of reduced, but of linearly increasing amplitudes, as at 24, 25. A very accurate indication may be obtained of the time of occurrence 22 from a plot (say at a ground monitoring station) of the line 23. The time 22 at which the monitored event occurred is deduced by extrapolating line 23 to the base line and referencing the intercept time of line 23 and the base line to the immediately preceding sampling pulse 21. Since the time at which the immediately preceding pulse 21 is known, the occurrence time marked by line 22 can easily be determined.

While I have described and illustrated one specific embodiment of the present invention, it will become apparent that variations of the specific details of construction may be resorted to without departing from the true spirit and scope of the invention as defined in the appended claims.

What is claimed is:

1. In a system for deriving information regarding the occurrence times of events, a condenser having a predetermined normal voltage, means for sampling the voltage of said condenser at equal time intervals, means responsive to an event for substantially instantaneously discharging said condenser to a predetermined level and for thereafter recharging said condenser linearly to said predetermined normal voltage in accordance with a predetermined law of time variation, the total re-charge time extending over at least two of said samplings.

2. In a system for deriving information regarding the occurrence times of events, a condenser having a predetermined steady normal voltage, means for sampling the voltage of said condenser at at least two equal time intervals, and means responsive to an event for modifying the voltage of said condenser according to a known linear law of variation of voltage with time over a time interval at least greater than the sampling period while continuing the sampling.

3. The combination of claim 2 wherein said means for modifying includes means for terminating the voltage of said capacitor when said law of variation reaches said steady normal voltage.

4. In a system for deriving information regarding the occurrence time of a random event, a condenser, a device for charging said condenser according to a predetermined linear law of variation of charge with time, means for initiating operation of said device in response to the occurrence of said event, and means for sampling the voltage of said condenser at least twice during said charging at the beginning and end of a known time interval.

5. The combination according to claim 4 wherein said means for sampling is a commutator.

6. In a system for deriving information regarding the occurrence time of a random event, a condenser having a normal predetermined voltage, a device for discharging said condenser to a predetermined lower voltage and thereafter charging said condenser to said normal predetermined voltage in accordance with a predetermined linear law of variation of voltage with time, means responsive to the occurrence of said event for effecting operation of said device, and means for sampling the voltage of said condenser periodically at equal time intervals prior to and after said event and during the time when said condenser is charging, said means for sampling being activated independently of the occurrence of said event.

7. In a system for deriving information regarding the occurrence time of a random event, a source having a normal first predetermined voltage, a condenser responsive to said source and normally maintained at said first predetermined voltage, a device for changing said voltage in response to the occurrence of said event to a second predetermined voltage substantially instantaneously and thereafter at a relatively slow predetermined linear rate to said first predetermined voltage, and means for continuously sampling said voltage periodically at equal time intervals, at least during the change of voltage, which are smaller than the total time of variation of said voltage between said second and first predetermined voltages, said means for sampling being activated independently of the occurrence of said event.

8. The combination according to claim 7 wherein said means for sampling is a periodic commutator.

9. In a system for deriving information regarding the occurrence times of events, an energy storing element normally storing a predetermined, constant energy level, means for sampling the energy level of said element at at least two equal time intervals, and means responsive to an event for modifying the energy level of said element according to a predetermined linear law of energy variation with time over a time interval at least greater than the sampling period while continuing the sampling.

10. In a system for deriving information regarding the occurrence times of events, an energy storing element normally maintained at a predetermined energy level, first means for changing the energy level of said element to a predetermined level and thereafter varying the energy level of said element to said normal level in accordance with a predetermined linear law of energy variation with time, means responsive to occurrence of said event for effecting operation of said first means, and second means for sampling the energy level of said element periodically at equal time intervals prior to and after said event and during the time when said condenser is charging, said means for sampling being activated independently of the occurrence of said event.

11. The system of claim 10 wherein said predetermined level is less than said normal level.

References Cited in the file of this patent

UNITED STATES PATENTS

| | | |
|---|---|---|
| 2,511,868 | Newson | June 20, 1950 |
| 2,704,364 | Summers | Mar. 15, 1955 |
| 2,715,219 | Otto | Aug. 9, 1955 |
| 2,727,209 | Mayer | Dec. 13, 1955 |
| 2,878,426 | Preli | Mar. 17, 1959 |
| 2,935,682 | Gates | May 3, 1960 |

FOREIGN PATENTS

| | | |
|---|---|---|
| 124,657 | Australia | July 3, 1947 |